United States Patent [19]
Bidlack et al.

[11] 3,801,301
[45] Apr. 2, 1974

[54] 4-CHLOROPHENYL-2-THIENYLIODONIUM TRIFLUOROACETATE AS A PLANT STUNTING AGENT

[75] Inventors: Harvey D. Bidlack, Shepherd; Dorsey R. Mussell, Clare, both of Mich.

[73] Assignee: The Dow Chemical Company, Midland, Mich.

[22] Filed: Mar. 23, 1972

[21] Appl. No.: 237,520

[52] U.S. Cl. .................................. 71/76, 71/90
[51] Int. Cl. ................................... A01n 9/12
[58] Field of Search .......................... 71/76, 90

[56] References Cited
UNITED STATES PATENTS
3,712,920   1/1973   Tezic et al. .................. 260/332.5
3,696,122   10/1972  Harrington et al. ......... 260/332.3 C
3,536,473   10/1970  Popoff et al. .................. 71/90

*Primary Examiner*—Lewis Gotts
*Assistant Examiner*—Catherine L. Mills
*Attorney, Agent, or Firm*—S. Preston Jones

[57] ABSTRACT

Method of regulating plant growth by the application of a growth regulating amount of 4-chlorophenyl-2-thienyliodonium trifluoroacetate corresponding to the formula

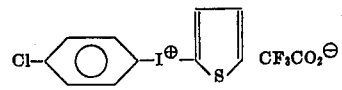

to the plant. Such practice is particularly useful for the regulation of the growth pattern of plant life, particularly as evidenced by the retardation of growth and enhancement of maturation.

1 Claim, No Drawings

4-CHLOROPHENYL-2-THIENYLIODONIUM TRIFLUOROACETATE AS A PLANT STUNTING AGENT

BACKGROUND OF THE INVENTION

One active area of agricultural research is devoted to the production of more productive plant life, particularly that plant life usually considered as or associated with food sources or beauty for man. In this research, considerable effort has been expended in developing means which will speed the production and reproduction aspects of plant growth.

These objectives have been accomplished, in part, by the discovery, development, and distribution of various (chemical) agents which alter or modify the growth characteristics of plants. Documentation of such can be found in, for example, Dwarfing Plants With Chemicals, Agricultural Research Service, U.S. Dept. of Agriculture, January, 1961.

SUMMARY OF THE INVENTION

The present invention is directed to a method which involves applying to viable plants and plant parts a growth regulating amount of 4-chlorophenyl-2-thienyliodonium trifluoroacetate. This method facilitates early maturation and causes a marked retardation in the growth or stunting of plants of both the broadleaf and narrowleaf species. Additionally, the method provides for plants which are in a good state of health, which are lush and bountiful in color and appearance, and which are of good resistance to plant diseases and attack by plant pests. In addition, the method may be readily carried out to procure these desirable properties without substantial injury to the plants.

4-Chlorophenyl-2-thienyliodonium trifluoroacetate is a crystalline solid which is substantially insoluble in water and of varied solubility in common organic solvents.

The exposure of viable plants and plant parts to the action of a growth regulating amount of the compound is essential and critical for the practice of the present invention. The exact dosage to be employed is dependent upon the response desired in the plant as well as such other factors as the plant specie and the stage of growth at which treatment is made, the soil type and the depth at which the compound is distributed in the soil, and climatic conditions such as temperature, wind and especially rainfall.

DETAILED DESCRIPTION AND PREFERRED EMBODIMENTS

In foliar treatments for the control and inhibition of vegetative growth, good results are obtained when from 0.10 pound to 20 pounds or more, preferably, 2 to 15 pounds of the halide compound are applied per acre. In emerging seedlings and established vegetation, good results are obtained when the active compound is distributed in the soil at the above dosage and through such a cross section of the soil as to provide for the presence therein of an effective concentration of the active compound. In such applications, it is desirable that the compound be distributed to a depth of at least 0.25 inch. In general, good results are obtained at dosages of from about 1 part or more, and preferably from 5 to 100 parts or more by weight of active agent per million parts by weight of soil.

The method of the present invention can be practiced by distributing the unmodified compound in growth media or upon the surfaces of the above-ground portion of plants. However, the present method also embraces the similar employment of liquid or dust compositions containing the compound. In such usages, the active compound can be modified with one or a plurality of additaments or adjuvants including water or other liquid carriers, surface active dispersing agents, and finely divided solids. Depending upon the concentration of the compound, such augmented compositions are adapted to be distributed in soil or upon the above ground surface of plants, or to be employed as concentrates and subsequently diluted with additional inert carrier to produce the ultimate treating compositions. In compositions where the adjuvant or helper is a finely divided solid, a surface active agent or the combination of a surface active agent and a finely divided solid, and/or a liquid additament, the adjuvant and/or adjuvants cooperate with the active compound so as to facilitate the invention and obtain an improved and outstanding result.

The exact concentration of the active compound to be employed in the treating compositions is not critical and may vary considerably provided the required dosage of the active compound is supplied in the growth medium or upon the plant foliage. The concentration of the active compound in liquid compositions employed to supply the desired dosage generally is from about 0.001 to 50 percent by weight although concentrations as low as 0.0001 percent and as high as 90 percent by weight are sometimes advantageously employed. In dusts, the concentration of toxicant is from about 0.1 to 90 percent by weight and usually not in excess of about 20 percent. In both liquid and dust compositions to be employed as concentrates, the active compound can be present in a concentration of from 5 to 98 percent by weight.

The quantity of treating compositions to be applied can vary considerably provided that the required dosage of the compound or active ingredient is applied in a sufficient amount of the finished composition to cover adequately the vegetation to be treated or to facilitate the penetration and distribution of said ingredient in growth media. The required amount of the active ingredient in the soil conveniently can be supplied per acre treated in from 10 to 27,000 gallons or more of the liquid carrier or in from 50 to 2,000 pounds of the solid carrier. In the treatment of seedling weeds, good coverage is obtained when using from 5 to 60 gallons of finished spray composition per acre. Where large succulent vegetation is concerned, it is frequently desirable to employ up to 250 gallons or more of the finished spray composition per acre to assure complete coverage of the above-ground portion of the vegetation. In the application of dusts to plant foliage, good results are obtained with from 40 to 2,000 pounds of finished dust per acre, the only requirement being that the required toxicant dosage be supplied in sufficient dust to achieve good coverage of the foliage.

Liquid compositions containing the desired amount of active ingredient can be prepared by dispersing the active compound in water or in organic liquid, with or without the aid of a suitable surface active dispersing agent such as a non-ionic emulsifying agent. Suitable organic liquid carriers include the agricultural spray oils and the petroleum distillates such as diesel fuel, kerosene, fuel oil, and naphthas. The organic liquid compositions can contain a small amount of water as a solvent for the active ingredient. In such compositions, the carrier comprises as emulsion, namely, a mixture of water, emulsifying agent and organic liquid. In the liquid compositions, the choice of dispersing and emulsifying agent and the amount thereof employed is dictated by the nature of the composition and by the ability of the agent to facilitate the dispersion of the halide compound in the carrier to produce the desired composition or to facilitate the wetting of surfaces upon which the compositions are applied. Dispersing and emulsifying agents which can be employed in the compositions include the condensation products of alkylene oxides with phenols and organic acids, alkyl aryl sulfonates, polyoxyalkylene derivatives of sorbitan esters, complex ether alcohols mahogany soaps and the like.

In the preparation of dust compositions, the active ingredient is dispersed in and on a finely divided solid such as clay, talc, chalk, gypsum, sugar, salt, bicarbonate, fertilizer and the like. In such operations, the finely divided carrier is mechanically mixed or ground with the active compound. Similarly, dust compositions containing the active compound can be prepared from various of the solid surface active dispersing agents such as bentonite, fuller's earth, attapulgite and other clays. Depending upon the proportion of ingredients, these dust compositions can be employed as concentrates and subsequently diluted with additional solid surface active dispersing agent or with chalk, talc or gypsum, sugar, salt, fertilizer, and the like to obtain the desired amount of active ingredient in a composition adapted to be employed for the modification of the growth of plants. Also such dust compositions can be dispersed in water with or without the aid of a dispersing agent to form spray mixtures.

When operating in accordance with the present invention, growth regulating amounts of the active compound are dispersed in soil or growth media in any convenient fashion. Applications to growth media can be carried out by simply mixing with the media, by applying to the surface of soil and thereafter dragging or discing into the soil to the desired depth or by employing a liquid carrier to accomplish the penetration and impregnation. The application of spray and dust compositions to the surface of soil or to the above-ground surfaces of plants can be carried out by conventional methods, e.g., power dusters, boom and hand sprayers and spray dusters.

In a further method, the distribution of the active compound in soil can be accomplished by introducing the agents in the water employed to irrigate the soil. In such procedures, the amount of water can be varied with the porosity and water-holding capacity of the soil to obtain the desired depth of distribution of the toxicant.

The expression "growth media" is employed in the present specification and claims in its broadest sense to be inclusive of all conventional soils and thus refers to any substance or media in which vegetation may take root and grow, and is intended to include not only earth but compost, manure, muck, humus and sand and the like, adapted to support plant growth.

The expression "surface active dispersing agent" as herein employed is intended to include all agents which are capable of acting at the interfacial surface as the dispersion medium. Thus, the term is inclusive of the solid emulsifying agents such as finely divided aluminum hydroxide and finely divided bentonite, fuller's earth, attapulgite and other clays, as well non-ionic wetting and emulsifying agents such as the alkaline earth metal caseinates, alkyl aryl sulfonates, sulfonated oils, complex organic ester derivatives, complex ether alcohols, and the like.

The finely divided inert solid or carrier as herein described refers to materials which are incapable of facilitating dispersion but which serve as a distribution medium for the active compounds. They include finely divided materials such as chalk, talc, gypsum, sugar, salt, bicarbonate, fertilizers, and so forth.

DESCRIPTION OF SOME PREFERRED EMBODIMENTS

The following examples serve to further typify the nature of the present invention and the manner by which it can be practiced and should not be construed as limiting upon the overall scope of the same.

EXAMPLE I

4-Chlorophenyl-2-thienyliodonium trifluoroacetate

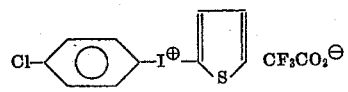

4-Chloroiodosobenzene diacetate (17.3 grams; 0.05 mole) was dispersed in a mixture of 15 milliliters of each of acetic anhydride and trifluoroacetic acid, and a solution of thiophene (8.4 grams; 0.10 mole) in 60 milliliters of acetic anhydride added slowly portionwise thereto. The addition was carried out with stirring over a period of 55 minutes and at a temperature of $-20°C$. Stirring was thereafter continued for 65 minutes at a temperature of $-20°C$., and the reaction mixture thereafter warmed to $-3°C$. and maintained with stirring at said temperature for 15 hours to insure completion of the reaction. The reaction mixture was thereafter concentrated by fractional distillation under reduced pressure up to a temperature of $50°C$. to remove low boiling constituents, and the resulting residue diluted with 100 milliliters of diethyl ether. DUring the dilution, the 4-chlorophenyl-2-thienyliodonium trifluoroacetate product precipitated as a crystalline solid and was separated by filtration. The solid was recrystallized from a mixture of acetone and normal pentane and the recrystallized product found to melt at $156°- 157.5°C$.

EXAMPLE II

4-Chlorophenyl-2-thienyliodonium trifluoroacetate was dispersed in water to prepare aqueous compositions, one containing 250 and another containing 4,000 parts per million parts by weight of the iodonium compound. These compositions were separately employed to treat seed beds of soil of good nutrient content planted with seeds of corn, wheat and wild oats. Additional beds of the same soil were also seeded with the named plant species and one left untreated to serve as a control and another treated only with water to serve as a water control. After treatment, the seed beds were maintained under conditions conducive to plant growth. Fifteen days after treatment, observations and recordations were made of the height and weight of the plants. The results of these observations are set forth below in Table I.

Table I

| Treatment | Application (a) Rate in ppm | Corn Height (b) | Corn Weight (c) | Wheat Height (b) | Wheat Weight (c) | Wild Oats Height (b) | Wild Oats Weight (c) |
|---|---|---|---|---|---|---|---|
| 4-chlorophenyl-2-thienyliodonium trifluoroacetate | 250 | 23.0 | 1.4 | 11.6 | 0.9 | 9.8 | 1.4 |
| do | 4,000 | 21.0 | 1.3 | 12.3 | 1.3 | 9.5 | 1.5 |
| Water control | 100 gallons per surface acre | 25.0 | 1.4 | 14.0 | 1.1 | 10.0 | 1.1 |
| Standard control | — | 27.0 | 1.7 | 16.0 | 1.3 | 12.0 | 1.9 |

(a) application rate given in parts per million by weight of the active compound.
(b) height given in centimeters.
(c) weight given in grams.

EXAMPLE III

4-Chlorophenyl-2-thienyliodonium trifluoroacetate was dispersed in water to prepare aqueous compositions, one containing 250, one containing 1,000 and another 4,000 parts per million by weight of the compound. These compositions were employed to treat separate stands of 1-week old corn plants growing in beds of sandy loam soil of good nutrient content. The applications were carried out with conventional spray equipment, the compositions being applied to the plants to the point of run-off. Adjacent stands of the same plant species were left untreated to serve as controls.

Two weeks after applications, observations and recordations were made of the height and weight of the plants. The results of this observation are set forth below in Table II.

Table II

Compound applied: 4-chlorophenyl-2-thienyliodonium trifluoroacetate

| Treatment | Rate in ppm (a) | Corn Height (b) | Corn Weight (c) |
|---|---|---|---|
| | | Active | |
| Compound | 250 | 39.3 | 6.3 |
| do | 1,000 | 39.3 | 6.2 |
| do | 4,000 | 39.6 | 6.6 |
| Control | — | 42.2 | 6.3 |

(a) application rate given in parts per million by weight of the active compound.
(b) height given in centimeters.
(c) weight given in grams.

EXAMPLE IV

4-Chlorophenyl-2-thienyliodonium trifluoroacetate was dispersed in water to prepare an aqueous composition containing 1,000 parts per million by weight of the compound. The composition was employed to treat a stand of 1-week old bean plants growing in beds of sandy loam soil of good nutrient content. The application was carried out with conventional spray equipment, the composition being applied to the plants to the point of run-off. An adjacent stand of the same plant specie was left untreated to serve as a control.

Two weeks after application, observations and recordations were made of the height and weight of the plants. The results of this observation are set forth below in Table III.

Table III

| Treatment | Rate in ppm (a) | Beans Height (b) | Beans Weight (c) |
|---|---|---|---|
| 4-Chlorophenyl-2-thienyliodonium trifluoroacetate | 1,000 | 14.0 | 6.9 |
| Control | — | 18.0 | 7.6 |

(a) application rate given in parts per million by weight of the active compound.
(b) height given in centimeters.
(c) weight given in grams.

EXAMPLE V

4-Chlorophenyl-2-thienyliodonium trifluoroacetate was dispersed in water to prepare aqueous compositions, one containing 1,000 and another 7,000 parts per million by weight of the compound. These compositions were employed to treat separate stands of 1-week old wheat plants growing in beds of sandy loam soil of good nutrient content. The applications were carried out with conventional spray equipment, the compositions being applied to the plants to the point of run-off. Adjacent stands of the same plant species were left untreated to serve as control.

Two weeks after application, observations and recordations were made of the height and weight of the plants. The results of this observation are set forth below in Table IV.

Table IV

| Treatment | Rate in ppm (a) | Wheat Height (b) | Wheat Weight (c) |
|---|---|---|---|
| 4-Chlorophenyl-2-thienyliodonium trifluoroacetate | 1,000 | 35.9 | 13.3 |
| do | 4,000 | 33.5 | 13.2 |
| Control | — | 38.0 | 11.8 |

(a) application rate given in parts per million by weight of the active compound.
(b) height given in centimeters
(c) weight given in grams

EXAMPLE VI

4-Chlorophenyl-2-thienyliodonium trifluoracetate was dispersed in water to prepare an aqueous composition containing 250 parts per million by weight of the compound. This composition was employed to treat a stand of 1-week old wild oat plants growing in beds of sandy loam soil of good nutrient content. The application was carried out with conventional spray equipment, the composition being applied to the plants to the point of run-off. Adjacent stands of the same plant specie were left untreated to serve as control.

Two weeks after application, observations and recordations were made of the height and weight of the plants. The results of this observation are set forth below in Table V.

Table V

| Treatment | Rate in ppm (a) | Wild Oat Height (b) | Weight (c) |
|---|---|---|---|
| 4-Chlorophenyl-2--thienyliodonium trifluoroacetate | 250 | 19.1 | 7.5 |
| Control | — | 21.3 | 6.8 |

(a) application rate given in parts per million by weight of the active compound
(b) height given in centimeters
(c) weight given in grams

EXAMPLE VII

4-Chlorophenyl-2-thienyliodonium trifluoroacetate was dispersed in water to prepare aqueous compositions, one containing 250, one containing 500 and another 1,000 parts per million by weight of the compound. These compositions were separately employed to treat single 7-day old cranberry bean plants growing in beds of sandy loam soil of good nutrient content. Additional plants growing in the same soil are left untreated to serve as a control. Two weeks after treatment, observations and recordations were made of the height (total growth) of the plants. The results of this observation are set forth below in Table VI.

Table VI

| Treatment | Two Week Total Growth of Single Cranberry Bean Plants (a) Application rate (b) in ppm | | |
|---|---|---|---|
| | 250 | 500 | 1,000 |
| 4-Chlorophenyl-2--thienyliodonium trifluoroacetate | 21.5 | 12.5 | 21.0 |
| Control | 25.0 | 40.0 | 35.0 |

(a) total growth given as height in centimeters
(b) application rate given in parts per million by weight of the active compound

What is claimed is:
1. A method for stunting plant growth of plants which comprises contacting viable plants and plant parts with a growth stunting amount of 4-chlorophenyl-2-thienyliodonium trifluoroacetate.

* * * * *